March 8, 1966   H. A. AKE WALLGREN   3,238,970
PIVOTED DIVERTER VALVE
Filed Feb. 5, 1963   2 Sheets-Sheet 1

INVENTOR.
BY Harold Anton Ake Wallgren
ATTORNEY

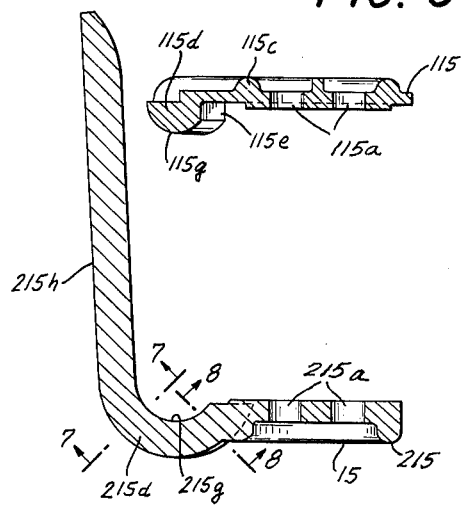
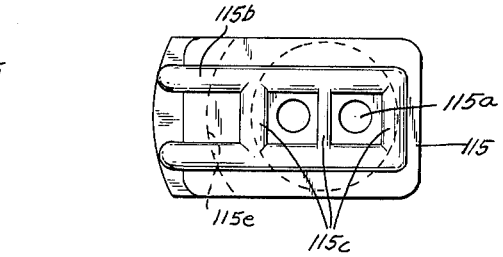
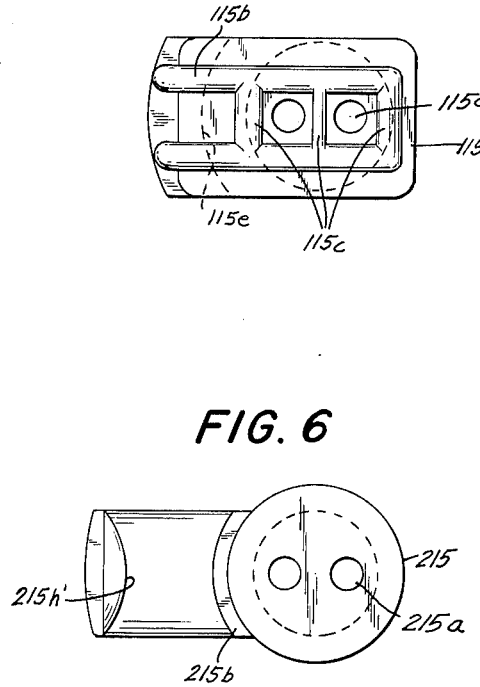
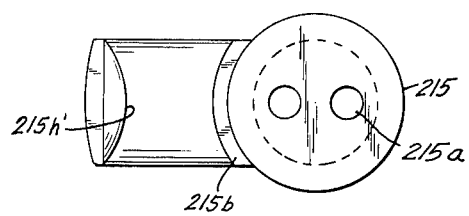
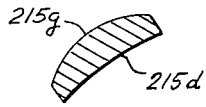

United States Patent Office 3,238,970
Patented Mar. 8, 1966

3,238,970
PIVOTED DIVERTER VALVE
Harald Anton Ake Wallgren, Alvsjo, Sweden, assignor to Aktiebolaget Electrolux, Stockholm, Sweden, a corporation of Sweden
Filed Feb. 5, 1963, Ser. No. 256,348
Claims priority, application Sweden, Feb. 7, 1962, 1,331/62
10 Claims. (Cl. 137—612)

My invention relates to valve structure.

An object of my invention is to provide an improved valve structure of simplified construction which can be readily assembled.

Another object of the invention is to provide an improved valve structure having a liquid inlet and a first outlet from which liquid may flow in a first path to a place of use, a second outlet through which liquid diverted from the place of use flows in a second path, and a manually movable valve member for regulating the liquid discharged through the second outlet and diverted from the first path of flow.

A further object of the invention is to provide an improved valve structure comprising a housing provided with a wall having at an opening therein an inwardly facing valve seat toward and from which a valve member within the housing is angularly movable, and a hinge for pivotally mounting the valve member for such angular movement, the hinge including a plurality of parts of which one part is formed by the wall at the vicinity of the opening.

Further objects and advantages of the invention will become apparent as the following description proceeds, and the features of novelty which characterize the invention will be pointed out with particularity in the claims annexed to and forming a part of this specification.

Figure 1:
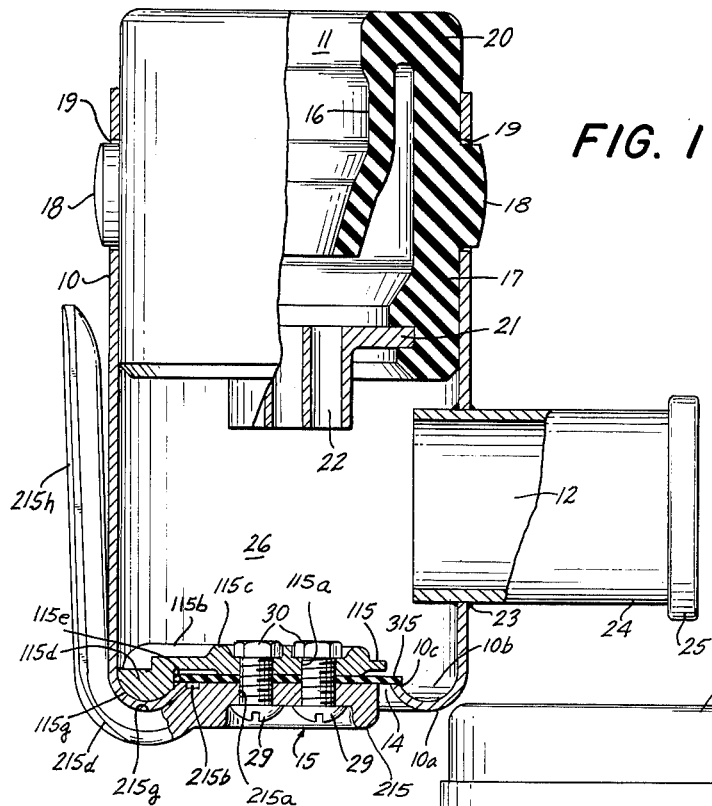
Figure 2:
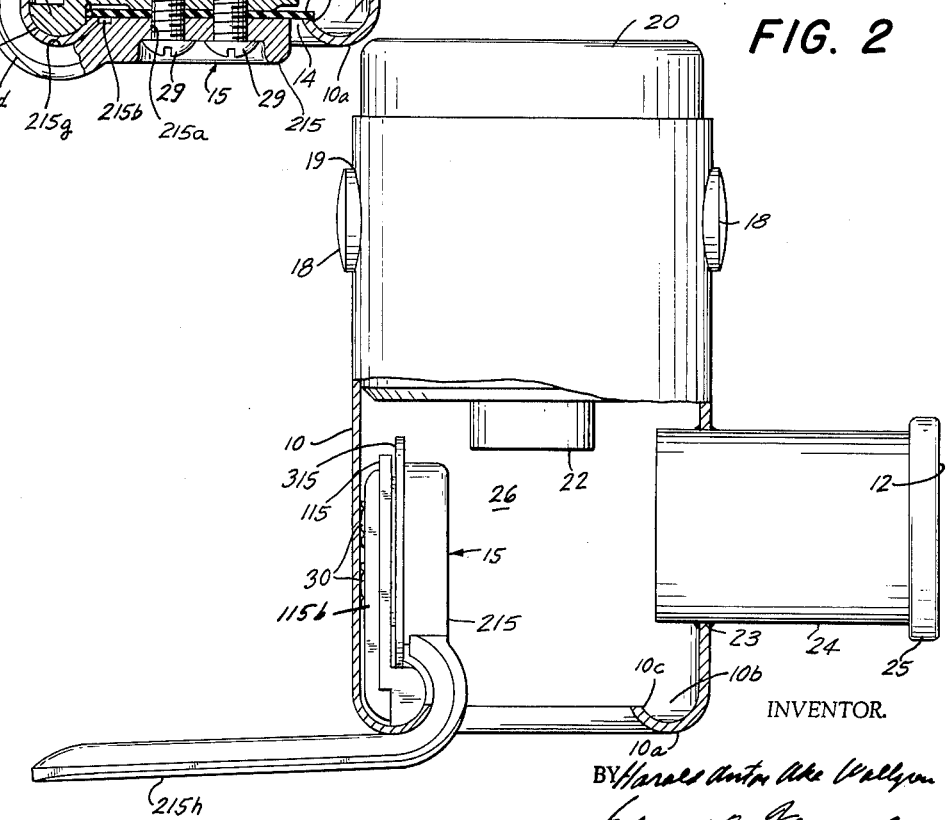

In the drawing, FIG. 1 is an elevation view, partly broken away, of valve structure embodying my invention; FIG. 2 is an elevation view, partly broken away, of the valve structure shown in FIG. 1, in which the valve member is illustrated in its open position; FIGS. 3 and 4 are vertical sectional views of details of the valve member shown in FIGS. 1 and 2; FIGS. 5 and 6 are top plan views of the details shown in FIGS. 3 and 4, respectively; and FIGS. 7 and 8 are sectional views taken at lines 7—7 and 8—8, respectively, of FIG. 4.

Referring to FIGS. 1 and 2, I have shown my invention embodied in valve structure comprising a housing 10 having a liquid inlet 11, a first outlet 12 from which liquid may flow in a first path to a place of use, a second outlet 14 through which liquid diverted from the place of use flows in a second path, and a manually movable valve member 15 for regulating the liquid discharged through the second outlet 14 and diverted from the first path of flow.

In accordance with my invention, the inlet 11 and second outlet 14 are respectively disposed at the top and bottom of the housing 10 and in vertical alignment with one another, the first outlet 12 is provided at the wall of the housing between the second outlet 14 and the inlet 11 which is formed to be detachably connected to a water faucet or like fixture, and the manually movable valve member 15 is pivotally mounted on the bottom of the housing.

The liquid inlet 11 is defined by an inner reentrant sleeve 16 of a tubular member 17 which is resilient and formed with diametrically opposed raised portions or buttons 18 at its outer surface which fit snugly in openings 19 formed in the upright wall of the housing 10 which may be cylindrical. The inner sleeve 16, outer tubular member 17 and buttons 18 desirably are formed from a single body of material and integral with one another.

The inner sleeve 16 is connected at 20 to the upper end of the tubular member 17 which projects upward from the top edge of the housing 10. The bottom part of the inner sleeve 16 tapers toward its extreme lower end to form a flexible neck adapted to be detachably connected to a water faucet or like fixture.

The sleeve 16, tubular member 17 and buttons 18 may be formed of an elastomeric material which may be any suitable resilient substance such as natural or synthetic rubber, or plastic. The tubular member 17 extends below the inner sleeve 16 and is formed to receive and hold a disk 21 having a plurality of openings or passages 22 therein.

Below the disk 21 the wall of housing 10 is provided with an opening 23 which defines the outlet 12 and at which region is fixed the inner end of a hollow tubular member 24 whose outer beaded end 25 is adapted to be connected to a domestic appliance like a washing machine or dishwasher, for example. When the inlet 11 is connected to a source of supply of water and valve member 15 is in its closed position illustrated in FIG. 1, the water flows through the openings 22 in the disk 21 into a chamber 26 in the housing 10 and from the latter through the outlet 12 to a place of use, the axis of the outlet 12 being at a right angle or normal to the longitudinal axis of the housing 10. When the valve member 15 is moved from its closed position illustrated in FIG. 1, water normally flowing through the outlet 12 is diverted from the place of use and is discharged through the outlet 14.

In accordance with my invention, the valve member 15 is pivoted on the housing 10 in such manner that the pivotal connection is formed by the bottom part 10a of the housing and the top and bottom parts 115 and 215 of valve member 15 which coact therewith. The bottom part 10a of the housing 10 is formed by an inwardly extending flange or end wall which is semi-circular in cross-section and forms a circular groove or trough 10b at the bottom of the housing. The extreme inner edge 10c of the flange 10a defines a seat 10c for a disk-shaped valve 315 which is formed of resilient material and clamped between the top and bottom valve member parts 115 and 215, the latter having aligned openings 115a and 215a for threaded screws 29 which receive tightening nuts 30.

Referring to FIGS. 3 and 5, the top part 115 of the valve member 15 is generally of rectangular shape having spaced longitudinal ridges 115b and transverse ridges 115c defining recesses in which the tightening nuts 30 are disposed. One end of each of the longitudinal ridges 115b terminates at the top flat surface of a short bar 115d which is provided at an edge of the top part 115 of the valve member 15 and depends downward therefrom. The short bar 115d is of arcuate form and provided with a straight inner edge 115e against which snugly fits a portion of the curved periphery of the disk-shaped valve 315. The opposite edge and bottom of the bar 115d are curved in section, as indicated at 115g in FIG. 3, the curvature being such that the bar snugly fits in the trough 10b and is movable therein in the direction of its length.

The bottom part 215 of the valve member 15 is provided with a short bar 215d which is of arcuate form in vertical section and from the outer end of which extends a handle 215h. In FIGS. 1 and 3 it will be seen that the handle 215h is inclined slightly from the vertical and forms an angle with the bottom part 215 of valve member 15 which is slightly less than 270°. The top face of the bottom part 215 is formed with an arcuate-shaped notch at 215b over which a portion of the periphery of the disk-shaped valve 315 is disposed, thus insuring that the valve 315 will snugly fit on its seat 10c when the valve member 15 is moved to its closed position. Between the arcuate-shaped notch 215b and the handle 215h the top of the bar 215d is curved, as indicated at 215g in FIGS.

1 and 4, the curvature being such that the bar snugly fits against the outer surface of the flange 10a and is movable lengthwise thereof.

It will now be understood that the flange 10a of the housing 10 and the top and bottom parts 115 and 215 of the valve member 15 constitute coacting hinge parts providing a pivotal connection for moving the valve member between its closed and open positions shown in FIGS. 1 and 2, respectively. The flange 10a functions as a projection, and the bars 115d and 215d form a jaw, the flange being shaped and formed to retain and hold the coacting jaw parts 115d and 215d thereon. The flange 10a and jaw parts 115d and 215d essentially form a knuckle joint which does not require a pin to hold the jaw parts on the projection.

When the valve member 15 is moved by the handle 215h from its open position in FIG. 2 to its closed position in FIG. 1, the angular momentum imparted thereto by gravity tends to hold the valve member in its closed position. Similarly, when the handle 215h is moved downward from the position shown in FIG. 1 to the position shown in FIG. 2 to open the valve member 15, the angular momentum imparted thereto by gravity tends to hold the valve member 15 in its open position. The tendency for the valve member 15 to stay in the position to which it is moved is accomplished by providing the pivotal connection shown and just described and positioning the handle 215h so that it extends alongside of and nearly parallel to the housing 10 when the valve member 15 is closed and practically at a right angle to the wall of the housing when the valve member is open. When the valve member 15 is closed, as shown in FIG. 1, the water discharged under pressure through the openings 22 into the chamber 26 will exert force against the top of the valve member 15 to hold it against its seat 10c and close the outlet 14.

As shown in FIGS. 7 and 8, the curved top 215g of the bar 215d is of convex form. Also, the side of the handle 215h facing the housing 10 is of convex form, as indicated at 215h' in FIG. 6. Hence, only the center zones of the bar 215d and the handle 215h along their medial line come in physical contact with the bottom part of the housing 10 and the flange 10a when the valve member 15 is moved to its closed position. With this construction, the valve member 15 can easily be rotated on the flange 10a by the handle 215h to make the handle more accessible to open and close the valve member, such rotation of the valve member 15 being limited only when the tubular member 24 is in the path of movement of the handle 215h. When the valve member 15 is open and the handle 215h is positioned below the tubular member 24, the handle can pass beneath the tubular member to rotate the valve member.

The valve member 15 is angularly movable through an angle of at least 90° between an open position within chamber 26, in which the ridges 115b of the top valve member part 115 bear against the side wall of the housing 10, as seen in FIG. 2, and a closed position in which an outer face portion of the part 315 of the valve member bears against the valve seat.

In view of the foregoing, it will now be understood that the valve structure embodying the invention comprises a housing 10 having an inlet 11 adapted to be connected to a source of fluid under pressure. The housing 10 includes wall means defining a space 26 and has a first outlet 12 through which fluid supplied to the inlet is adapted to flow from the space. The housing 10 has a second outlet 14 through which fluid supplied to the inlet 11 is adapted to flow from the space 26. The valve member 15 is mounted on the housing for movement to and from a closed position at the second outlet 14. It will be observed that the wall means of the housing 10 provides a path for fluid to enable fluid passing from the inlet 11 to be divided and flow to both the first and second outlets 12 and 14 when the valve member 15 is moved toward its open position from its closed position at the second outlet and to enable the valve member 15 to be subjected to the pressure of the fluid in the space 26 when it is moved to its closed position at the second outlet 14 and all of the fluid flows from the space through the first outlet 12.

As seen in FIGS. 1 and 2, the wall means of the housing 10 is formed with a convex-shaped flange 10a which is bent radially inward toward the axis of the second outlet 14 and then back upon itself. The flange 10a is substantially semi-circular in cross-section and defines a ring-shaped groove 10b which opens into the space 26 and has an outer wall or side merging with the side wall of the housing 10 and an inner side or wall terminating at a free edge which defines the second outlet 14 and forms a seat 10c for the valve member 15. As explained above, the flange 10a and spaced jaw parts 115d and 215d fixed to the valve member 15 provide a knuckle joint type of pinless hinge.

Although I have shown and described a single embodiment of my invention, I do not wish to be limited to the particular arrangement set forth, and I intend in the following claims to cover all modifications which do not depart from the spirit and scope of my invention.

I claim:

1. Valve structure comprising a housing having an inlet for liquid adapted to be connected to a source of supply of liquid under pressure, the housing including wall means defining a space and having a first outlet through which liquid supplied to the inlet is adapted to flow from the space, the housing having a second outlet through which liquid supplied to the inlet is adapted to flow from the space, a valve member, means for pivotally mounting the valve member on the housing for movement to and from a closed position at the second outlet, and the wall means providing a path for liquid to enable liquid passing from the inlet to be divided and flow to both the first and second outlets when the valve member is moved toward its open position from its closed position at the second outlet, and to enable the valve member to be subjected to the pressure of the liquid in the space when it is moved to its closed position at the second outlet and all of the liquid flows from the space through the first outlet.

2. Valve structure as set forth in claim 1 in which the wall means is formed with a convex-shaped flange which is bent radially inward toward the axis of the second outlet and then back upon itself, the flange being substantially semi-circular in cross-section and defining a ring-shaped groove which opens into the space and has an outer side and an inner side terminating at a free edge which defines the second outlet and forms a seat for the valve member, the means for pivotally mounting the valve member on the housing comprising the flange and first and second parts fixed to the valve member, the parts having a gap therebetween to form an open jaw, and the flange functioning as a projection which is snugly disposed in the jaw to provide a knuckle joint type of pinless hinge to enable the valve member to move between an open position within the space and a closed position at the seat with a face of the valve member directed outwardly of the space.

3. Valve structure as set forth in claim 2 in which the first part is disposed in the groove and formed with a surface at least partly conforming to the inner surface thereof and the second part is disposed at the outer convex-shaped surface of the flange and formed with a surface at least partly conforming to the surface thereof.

4. Valve structure as set forth in claim 3 in which the first and second parts extend lengthwise of the groove and flange, respectively, and are of arcuate form to enable them to be moved angularly about the second outlet.

5. Valve structure comprising a housing having an inlet for fluid adapted to be connected to a source of supply of fluid under pressure, the housing including wall means defining a space and having an outlet through which fluid supplied to the inlet is adapted to flow from the space, a valve member, means for pivotally mounting the valve member on the housing for movement to and from a closed position at the outlet, the wall means being formed with a convex-shaped flange which is bent radially inward toward the axis of the outlet and then back upon itself, the flange being substantially semicircular in cross-section and defining a ring-shaped groove which opens into the space and has an outer side and an inner side terminating at a free edge which defines the outlet and forms a seat for the valve member, the means for pivotally mounting the valve member on the housing comprising the flange and first and second parts fixed to the valve member, the parts having a gap therebetween to form an open jaw, and the flange functioning as a projection which is snugly disposed in the jaw to provide a knuckle joint type of pinless hinge to enable the valve member to move between an open position within the space and a closed position at the seat with a face of the valve member directed outwardly of the space.

6. Valve structure as set forth in claim 5 in which the first part is disposed in the groove and formed with a surface at least partly conforming to the inner surface thereof and the second part is disposed at the outer convex-shaped surface of the flange and formed with a surface at least partly conforming to the surface thereof.

7. Valve structure as set forth in claim 6 in which the first and second parts extend lengthwise of the groove and flange, respectively, and are of arcuate form to enable them to be moved angularly about the outlet.

8. Valve structure as set forth in claim 6 in which the second part disposed at the outer convex-shaped surface of the flange includes a section which extends from the valve member beyond the outer convex-shaped surface of the flange and serves as a handle for manually moving the valve member.

9. Valve structure as set forth in claim 8 in which the handle section of the second part assumes a first position adjacent to and alongside of the wall means when the valve member is moved to a closed position at the seat.

10. Valve structure as set forth in claim 9 in which the handle section of the second part moves from the wall means when it is manually operated to move the valve member from its closed position at the seat.

References Cited by the Examiner
UNITED STATES PATENTS

| | | | |
|---|---|---|---|
| 735,007 | 7/1903 | Watson | 137—527 X |
| 1,071,165 | 8/1913 | Manning | 137—603 |
| 1,329,015 | 1/1920 | Posson | 137—801 X |
| 1,368,970 | 2/1921 | Roberts | 251—298 X |
| 1,603,123 | 10/1926 | Kuehne | 137—527 |
| 1,680,333 | 8/1928 | Kooperstein | 137—603 |
| 1,920,698 | 8/1933 | Huguenin | 251—298 X |
| 2,474,286 | 6/1949 | Snyder | 137—610 X |
| 2,524,956 | 10/1950 | Brunetti | 137—610 X |

ISADOR WEIL, *Primary Examiner.*

WILLIAM F. O'DEA, *Examiner.*